(12) United States Patent
Iwaki

(10) Patent No.: US 11,960,660 B2
(45) Date of Patent: Apr. 16, 2024

(54) TERMINAL DEVICE, VIRTUAL OBJECT MANIPULATION METHOD, AND VIRTUAL OBJECT MANIPULATION PROGRAM

(71) Applicant: POPOPO INC., Tokyo (JP)

(72) Inventor: Shinnosuke Iwaki, Tokyo (JP)

(73) Assignee: POPOPO INC, Tokyo (JP)

( * ) Notice: Subject to any disclaimer, the term of this patent is extended or adjusted under 35 U.S.C. 154(b) by 0 days.

(21) Appl. No.: 17/997,900

(22) PCT Filed: Jul. 16, 2021

(86) PCT No.: PCT/JP2021/026792
§ 371 (c)(1),
(2) Date: Nov. 3, 2022

(87) PCT Pub. No.: WO2022/014700
PCT Pub. Date: Jan. 20, 2022

(65) Prior Publication Data
US 2023/0367403 A1    Nov. 16, 2023

(30) Foreign Application Priority Data

Jul. 16, 2020   (JP) .................................. 2020-121991

(51) Int. Cl.
*G06F 3/0346* (2013.01)
*G06F 3/04815* (2022.01)
(Continued)

(52) U.S. Cl.
CPC ........ *G06F 3/0346* (2013.01); *G06F 3/04815* (2013.01); *G06F 3/04845* (2013.01); *G06T 19/006* (2013.01)

(58) Field of Classification Search
None
See application file for complete search history.

(56) References Cited

U.S. PATENT DOCUMENTS

2014/0292645 A1* 10/2014 Tsurumi .............. G06F 3/04815
345/156
2018/0114365 A1* 4/2018 Egri ...................... G06T 19/006
(Continued)

FOREIGN PATENT DOCUMENTS

JP    2013164697 A    8/2013
JP    2014191718 A    10/2014
(Continued)

OTHER PUBLICATIONS

[English Translation] Notice of Reasons for Refusal dated Oct. 8, 2020 for Japanese Patent Application No. 2020-121991.
(Continued)

*Primary Examiner* — Duane N Taylor, Jr.
(74) *Attorney, Agent, or Firm* — Dorsey & Whitney LLP

(57) ABSTRACT

A terminal device according to one aspect presents an augmented reality space to a user. The terminal device includes: an image-capturing unit configured to capture an image of a real space; a display unit configured to display an augmented reality space image representing the augmented reality space including the real space captured by the image-capturing unit and a virtual object; a determination unit configured to determine at least a part of the virtual object as an operation target; and an object control unit configured to control an operation of the operation target in the augmented reality space. The object control unit detects a direction and an amount of a movement of the terminal device after the operation target is determined and moves the operation target based on the detected direction and amount of the movement of the terminal device.

20 Claims, 9 Drawing Sheets

(51) Int. Cl.
 G06F 3/04845 (2022.01)
 G06T 19/00 (2011.01)

(56) References Cited

U.S. PATENT DOCUMENTS

2018/0253152 A1* 9/2018 Forsblom ................ G06F 3/167
2019/0065027 A1* 2/2019 Hauenstein ......... G06F 3/04815

FOREIGN PATENT DOCUMENTS

| JP | 2016167217 A | 9/2016 |
| JP | 2018151855 A | 9/2018 |
| JP | 2019079056 A | 5/2019 |
| JP | 2020091758 A | 6/2020 |
| WO | 2022014700 A1 | 1/2022 |

OTHER PUBLICATIONS

International Search Report and Written Opinion (English Translation for ISR only) dated Oct. 12, 2021 for International Patent Application No. PCT/JP2021/026792, pp. all.

\* cited by examiner

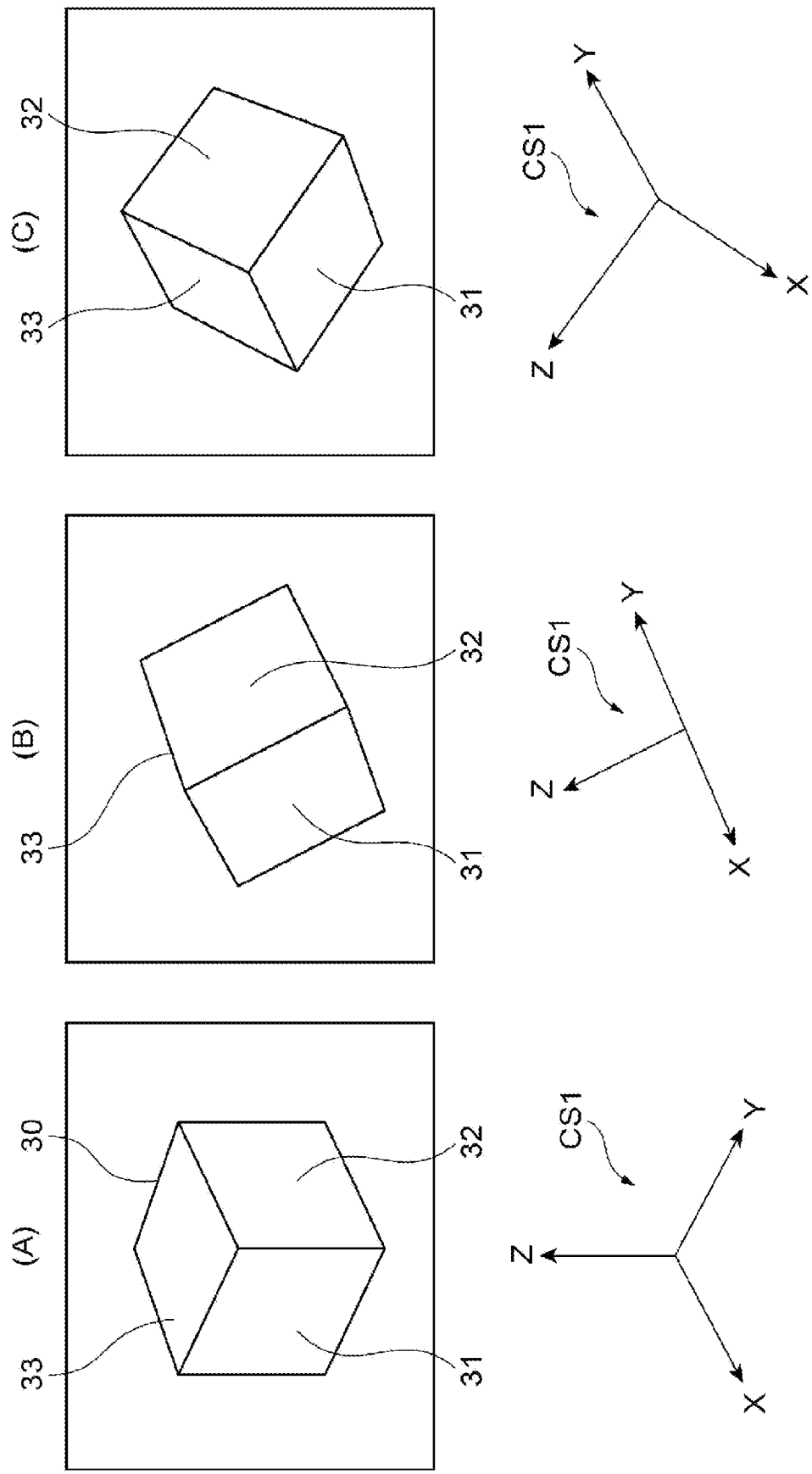

TERMINAL DEVICE, VIRTUAL OBJECT MANIPULATION METHOD, AND VIRTUAL OBJECT MANIPULATION PROGRAM

CROSS REFERENCE TO RELATED APPLICATION(S)

This application is a U.S. National Stage filing under 35 U.S.C. § 371 of PCT Application No. PCT/JP2021/026792, filed Jul. 16, 2021, which claims priority to Japanese Application No. 2020-121991, filed Jul. 16, 2020, which are incorporated herein by reference, in their entirety, for any purpose.

TECHNICAL FIELD

An aspect of the present disclosure relates to a terminal device, a virtual object operation method, and a virtual object operation program.

BACKGROUND ART

There is known a mechanism of providing users with an augmented reality space which is obtained by superimposing virtual objects on a real space. For example, Patent Document 1 discloses a mechanism of displaying indicators for adjusting parameters for components of a virtual object (i.e., a 3D object) on a screen, receiving an instruction from a user via an indicator, and adjusting, according to the instruction, the position of the component corresponding to the indicator. Patent Document 1 illustrates, as a specific example, a mechanism of vertically adjusting the position of the nose of a virtual object upward or downward by moving an indicator for the nose of the virtual object rightward or leftward.

CITATION LIST

Patent Document

PATENT DOCUMENT 1: Japanese Unexamined Patent Publication No. 2020-46863

SUMMARY OF THE INVENTION

Technical Problems

The mechanism disclosed in Patent Document 1 adjusts the position of a component of a virtual object through a user operation via an indicator. In the mechanism using the indicator displayed on a screen, however, only two-dimensional operations (e.g., an operation of sliding the indicator rightward or leftward as described above) are possible, that is, intuitive position adjustment of the component in the three-dimensional space is impossible.

To address the problem, it is an object of one aspect of the present disclosure to provide a terminal device, a virtual object operation method, and a virtual object operation program capable of allowing intuitive position adjustment of a virtual object in an augmented reality space.

Solution to the Problems

A terminal device according to one aspect of the present disclosure is a terminal device configured to present an augmented reality space to a user, the terminal device including: an image-capturing unit configured to capture an image of a real space; a display unit configured to display an augmented reality space image representing the augmented reality space including the real space captured by the image-capturing unit and a virtual object; a determination unit configured to determine at least a part of the virtual object as an operation target; and an object control unit configured to control an operation of the operation target in the augmented reality space, wherein the object control unit is configured to: detect a direction and an amount of a movement of the terminal device after the operation target is determined; and move the operation target based on the detected direction and amount of the movement of the terminal device.

Advantages of the Invention

An aspect of the present disclosure allows intuitive position adjustment of a virtual object in an augmented reality space.

BRIEF DESCRIPTION OF THE DRAWINGS

FIG. 9 illustrates a rotation operation of a virtual object according to a comparative example.

DESCRIPTION OF EMBODIMENT

Figure 1:
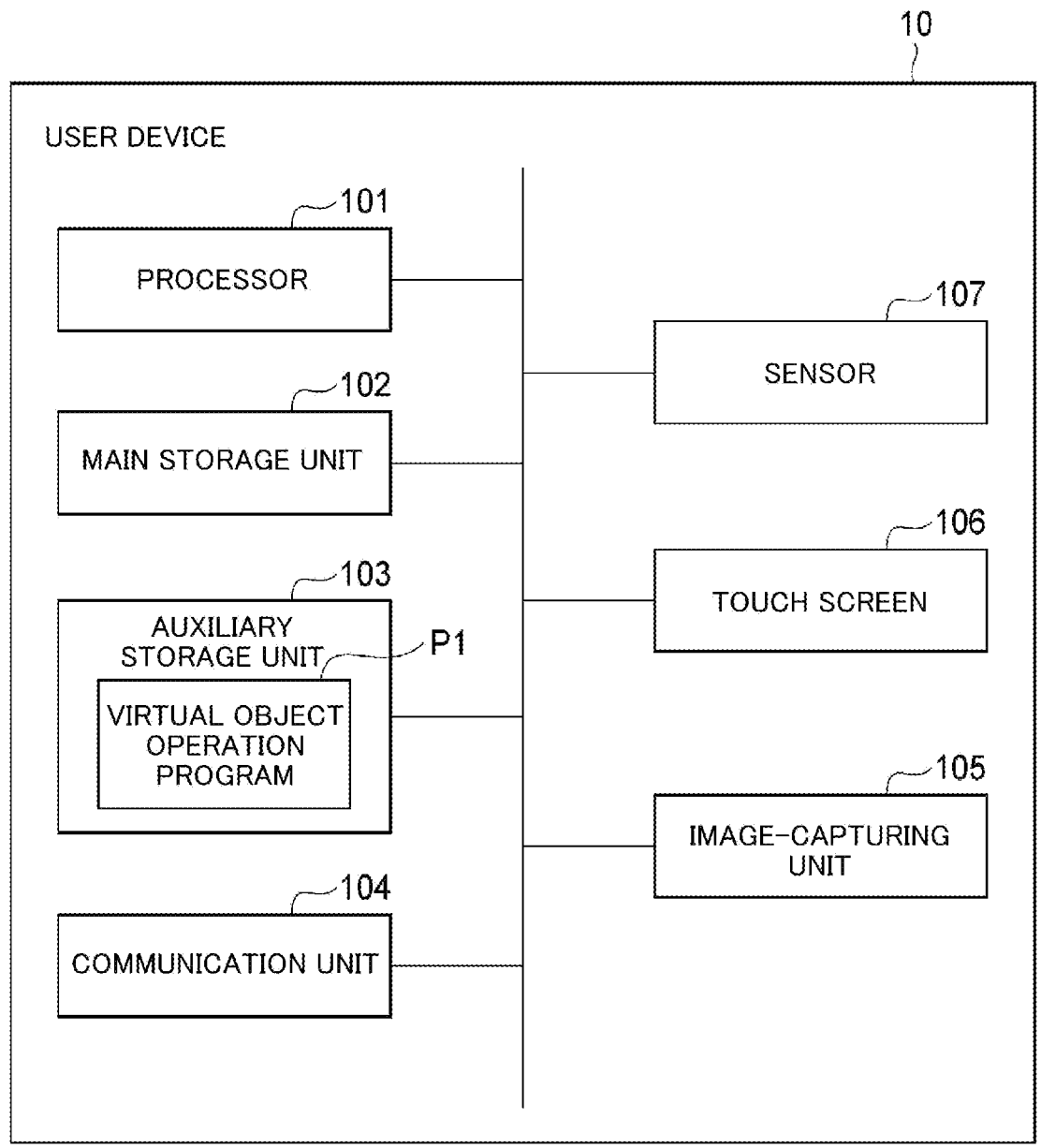
FIG. 1 illustrates an example hardware configuration of a user terminal that is a terminal device according to an embodiment.

Hereinafter, embodiments of the present disclosure will be described in detail with reference to the accompanying drawings. In the description of the drawings, the like or equivalent elements are denoted by the like reference numerals, and their explanations are not repeated.

[Configuration of User Terminal]

FIG. 1 illustrates an example hardware configuration of a user terminal 10 that is a terminal device according to an embodiment. The user terminal 10 is a computer used by a user. In this embodiment, the user terminal 10 mainly has an image-capturing function of capturing a real space, and a display function of displaying an augmented reality space image representing an augmented reality space obtained by superimposing a virtual object on the captured real space.

The virtual object refers to a general object that does not actually exist in the real space, but gives the user an impression as if it were in the real space by being superimposed on the real space. Examples of the virtual object include a character object (i.e., an avatar) imitating an animate object, such as human or an animal, an object imitating an inanimate object, such as a flower vase, and an object according to a user operation in the augmented reality space (e.g., an object imitating a cursor or any other pointer for pointing a position in the augmented reality space).

As long as the user terminal 10 is a terminal device with both the image-capturing function and the display function described above, the user terminal 10 may be of any type with any configuration. For example, the user terminal 10 may be a high-function mobile phone (e.g., a smartphone), a tablet terminal, a wearable terminal (e.g., a head-mounted display (HMD) or smart glasses).

As an example, the user terminal 10 includes a processor 101, a main storage unit 102, an auxiliary storage unit 103, a communication unit 104, an image-capturing unit 105, a touch screen (display unit) 106, and a sensor 107 as hardware components.

The processor 101 is a computing device that executes an operating system and application programs. The processor 101 may be a CPU or a GPU, for example, but the type of the processor 101 is not limited to these.

The main storage unit 102 is a device configured to store therein programs for realizing the user terminal 10, and computation results output from the processor 101, or other data. The main storage unit 102 is, for example, a ROM or a RAM.

The auxiliary storage unit 103 is typically a device capable of storing a larger amount of data than the main storage unit 102. The auxiliary storage unit 103 is a non-volatile storage medium such as a hard disk or a flash memory, for example. The auxiliary storage unit 103 is configured to store various data and a virtual object operation program P1 for causing a computer to function as the user terminal 10. For example, the auxiliary storage unit 103 may store data related to the virtual object.

The communication unit 104 is a device that establishes data communications with another computer via a communication network. The communication unit 104 is, for example, a network card or a wireless communication module. For example, the communication unit 104 may download data related to the virtual object from an external server device via a communication network such as the Internet, and store the downloaded data in the auxiliary storage unit 103.

The image-capturing unit 105 is a device configured to capture an image of a real space. The image-capturing unit 105 functions to capture images of the real world. The image-capturing unit 105 is a camera, for example. The image-capturing unit 105 may capture a moving image (video) or capture a still image (photograph). In a case of capturing a moving image, the image-capturing unit 105 processes a video signal based on a predetermined frame rate so as to yield a time-sequential series of frame images as a moving image.

The touch screen 106 functions as an input interface that receives user operations. For example, the touch screen 106 receives touch operations (e.g., tap operations, swipe operations, or multi-touch operations) performed by a user. The touch screen 106 also functions as an output interface that outputs data processed by the user terminal 10. The touch screen 106 functions to display an augmented reality space image representing an augmented reality space including a real space captured by the image-capturing unit 105 and a virtual object. That is, the user terminal 10 presents the augmented reality space to the user by causing the touch screen 106 to display the augmented reality space image.

The sensor 107 is a sensor for detecting a direction and an amount of movement (displacement) of the user terminal 10. The sensor 107 is, for example, an acceleration sensor. The type of the sensor 107 is however not limited thereto. For example, the sensor 107 may be a geomagnetic sensor, a gyro sensor, or any other suitable sensor, or may be configured by a group of sensors including sensors of different types in combination.

The functional elements (e.g., a display control unit 11, a determination unit 12, and an object control unit 13, which will be described later) of the user terminals 10 are each implemented by retrieval of the virtual object operation program P1 and execution of the virtual object operation program P1 by the processor 101 or the main storage unit 102. The virtual object operation program P1 includes codes for realizing the functional elements of the user terminal 10. The processor 101 causes the communication unit 104, the image-capturing unit 105, the touch screen 106, or the sensor 107 to operate in accordance with the virtual object operation program P1 to write and read data in and from the main storage unit 102 or the auxiliary storage unit 103. Through this processing, the functional elements of the user terminal 10 are realized.

The virtual object operation program P1 may be provided after being fixedly recorded in a tangible recording medium, such as a CD-ROM, a DVD-ROM, or a semi-conductor memory. As an alternative, the virtual object operation program P1 may be provided, as data signals superimposed on carrier waves, via a communication network.

[Functional Configuration of User Terminal]

Figure 2:
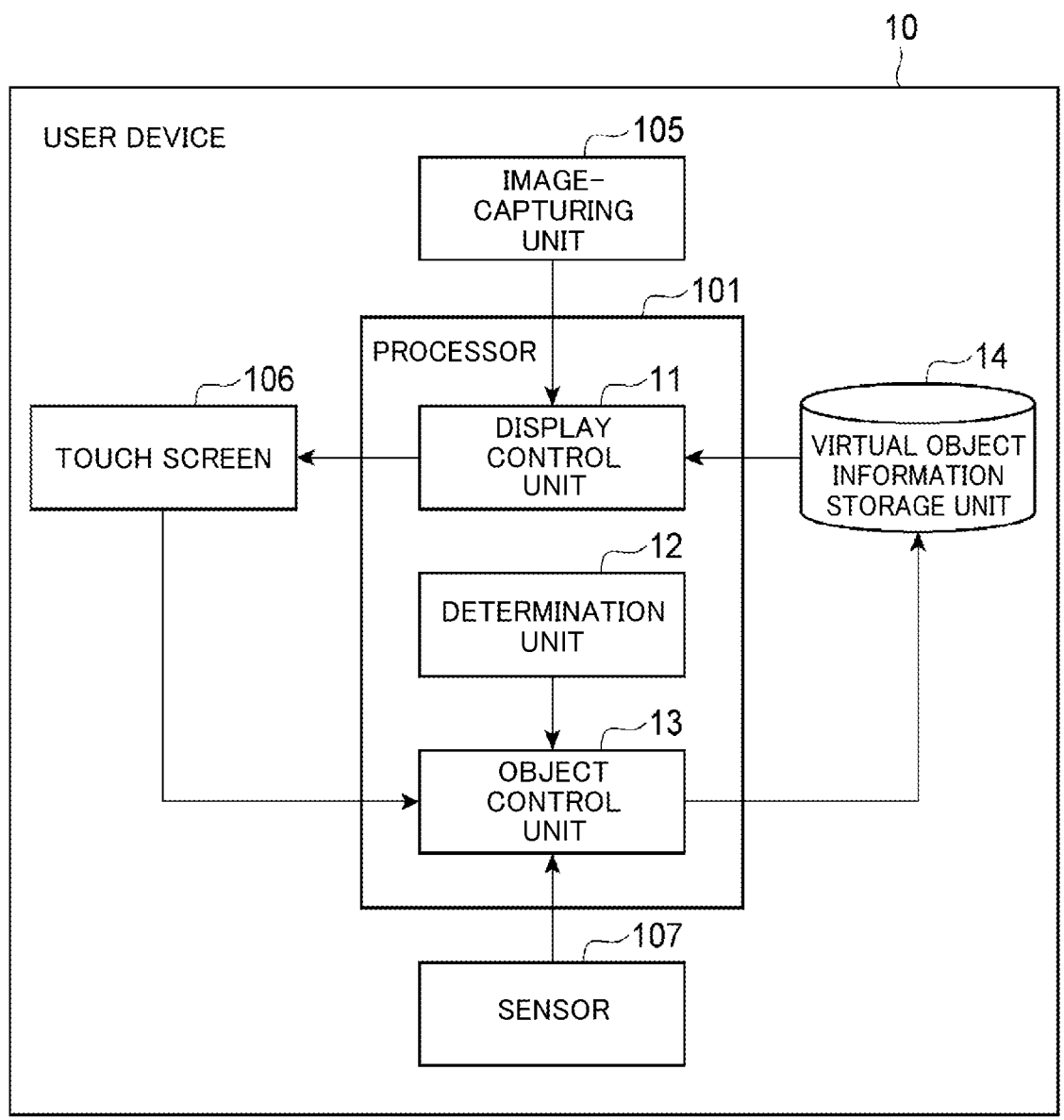
FIG. 2 illustrates an example functional configuration of the user terminal illustrated in FIG. 1.

FIG. 2 illustrates an example functional configuration of the user terminal 10. The user terminal 10 includes the display control unit 11, the determination unit 12, the object control unit 13, and a virtual object information storage unit 14 as functional elements. The virtual object information storage unit 14 stores therein virtual object information related to the virtual object. The virtual object information storage unit 14 may be the auxiliary storage unit 103 described above, for example.

The virtual object information includes information for superimposing the virtual object on the real space. For example, the virtual object information includes arrangement information for specifying the position and posture (i.e., angle) of the virtual object in the augmented reality space. If the virtual object includes a plurality of parts (e.g., joints which will be described later, or the like) and position adjustment can be performed individually for each of parts, the arrangement information may include information for specifying the position and posture of the part. The information for specifying the position of each part of the virtual object can be represented, for example, by coordinates in a three-dimensional coordinate space set in the real space captured and recognized by the image-capturing unit 105.

The virtual object information may include information defining the specifications of the virtual object. The specifications of a virtual object refer to a rule or method of controlling the virtual object. For example, the specifications of a virtual object include at least one of the configuration (e.g., the shape and the size), the motion, and the sound of the virtual object. The data structure of the model data of the virtual object is not limited and may be designed in any suitable manner. For example, the model data on a character object may include information on a plurality of joints and a plurality of bones constituting the character object, graphic data indicating an appearance design of the character object, and an ID which is an identifier for uniquely identifying the character object. Examples of the information on joints and bones include three-dimensional coordinates of individual joints and combinations of adjacent joints (i.e., bones). However, the configuration of the information is not limited to thereto and may be designed in any suitable manner.

The display control unit 11 causes the touch screen 106 to display an augmented reality space image. For example, the display control unit 11 continuously acquires the real space images representing a real space, which are captured by the image-capturing unit 105, and acquires (refers to) virtual object information stored in the virtual object information storage unit 14. The display control unit 11 superimposes a virtual object on a real space image based on the arrangement information included in the virtual object information. In this way, the augmented reality space image is generated. The display control unit 11 causes the touch screen 106 to display the augmented reality space image generated in this manner.

The determination unit 12 determines at least a part of a virtual object as an operation target. If the virtual object includes a plurality of parts and operation can be performed individually for each of the parts, the part can be determined as the operation target. For example, the determination unit 12 may be configured to receive a user operation (e.g., tapping or holding-down) touching one of the parts of the virtual object displayed on the touch screen 106 and determine the part touched by the user as the operation target. Examples of the possible operation on the operation target include a moving operation and a rotation operation which will be described later.

The object control unit 13 controls the operations of the operation target in the augmented reality space. The object control unit 13 can execute a moving operation of moving the operation target in accordance with a movement of the user terminal 10, and a rotation operation of rotating the operation target in accordance with a user operation (e.g., a swipe operation) on the touch screen 106. The moving operation or rotation operation of the virtual object is reflected on the augmented reality space image on the touch screen 106 by the following mechanism, for example. For example, the object control unit 13 updates the virtual object information related to the operation target stored in the virtual object information storage unit 14 to a value representing the state (e.g., position or posture) of the operation target reflecting the moving operation or the rotation operation. After that, the display control unit 11 updates the state of the operation target on the augmented reality space image on the basis of the virtual object information updated. Accordingly, the augmented reality space image reflecting the moving operation or the rotation operation is displayed on the touch screen 106.

[Moving Operation of Character Object]

Figure 3:
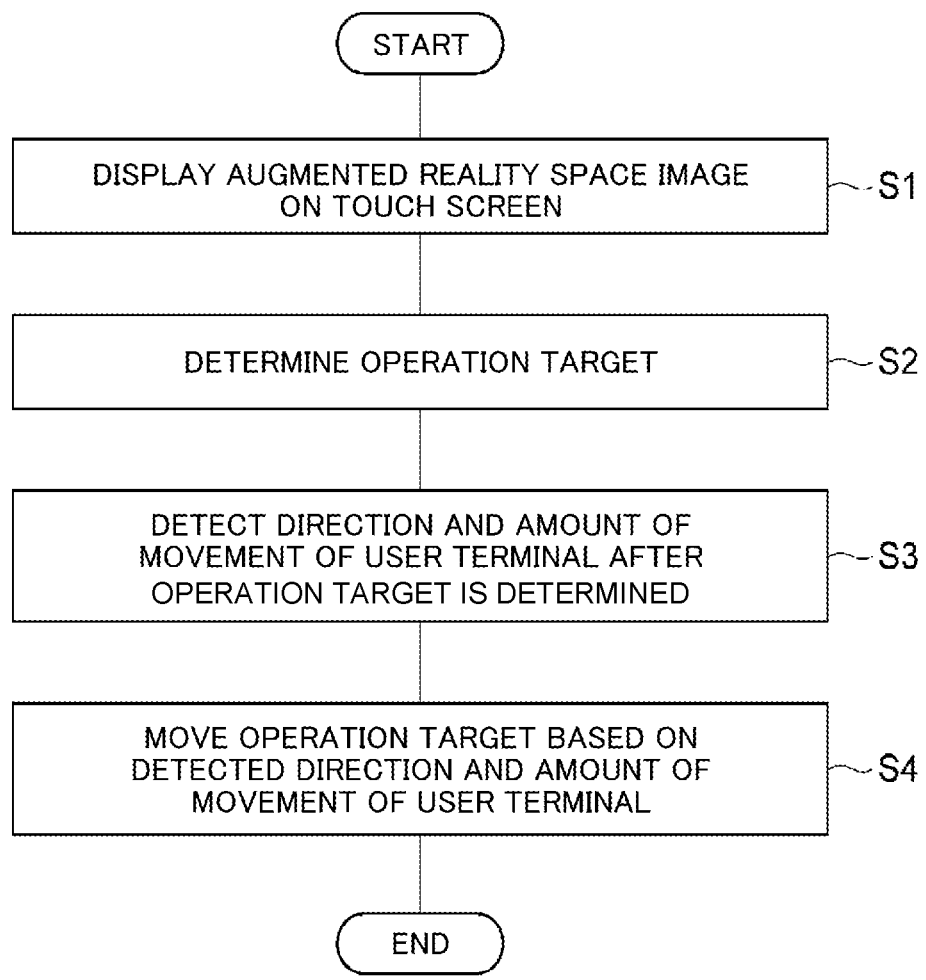
FIG. 3 is a flowchart illustrating an example processing procedure of a moving operation of a character object using the user terminal in FIG. 1.
Figure 4:
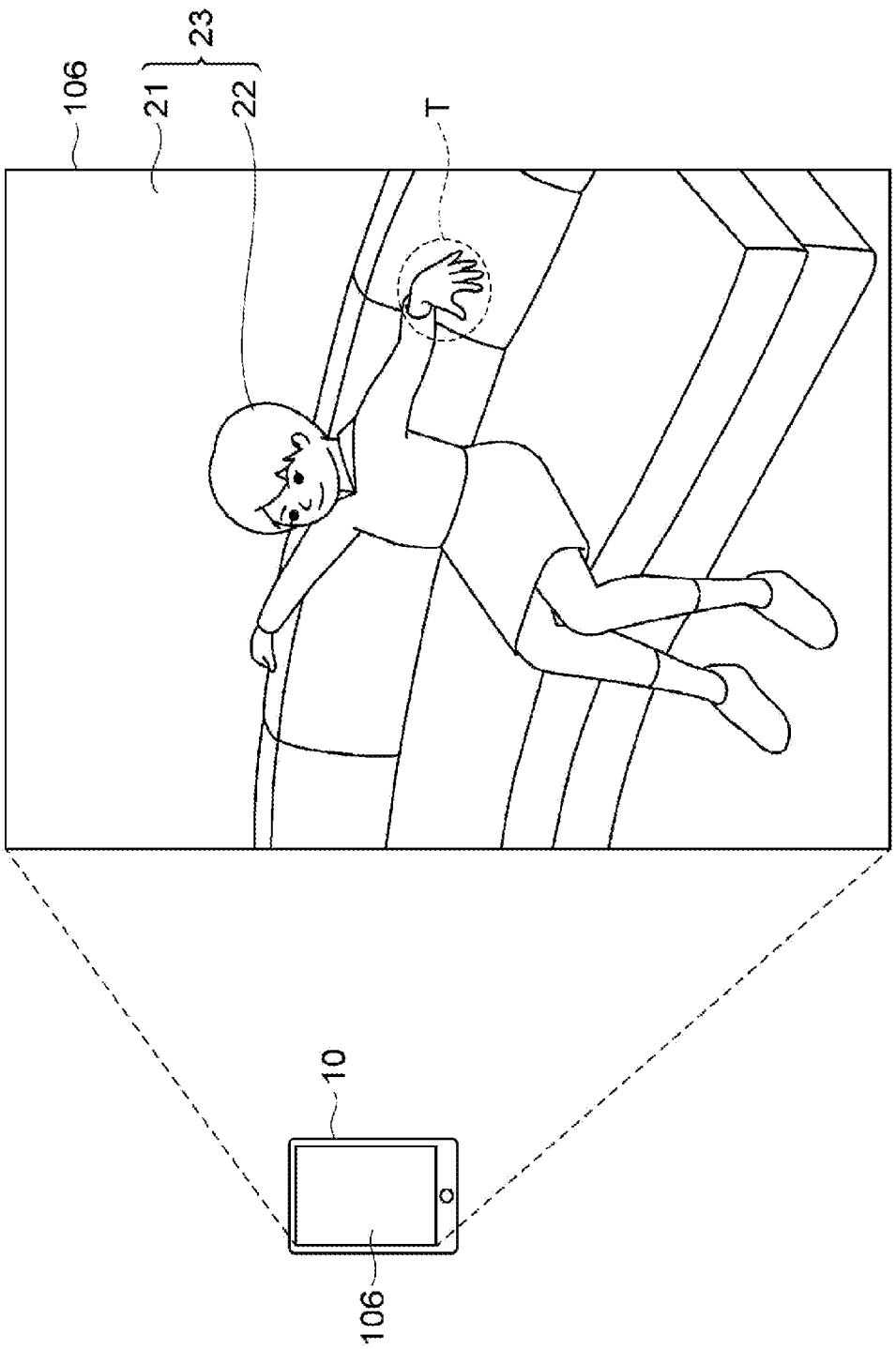
FIG. 4 illustrates an example moving operation of the character object.
Figure 5:
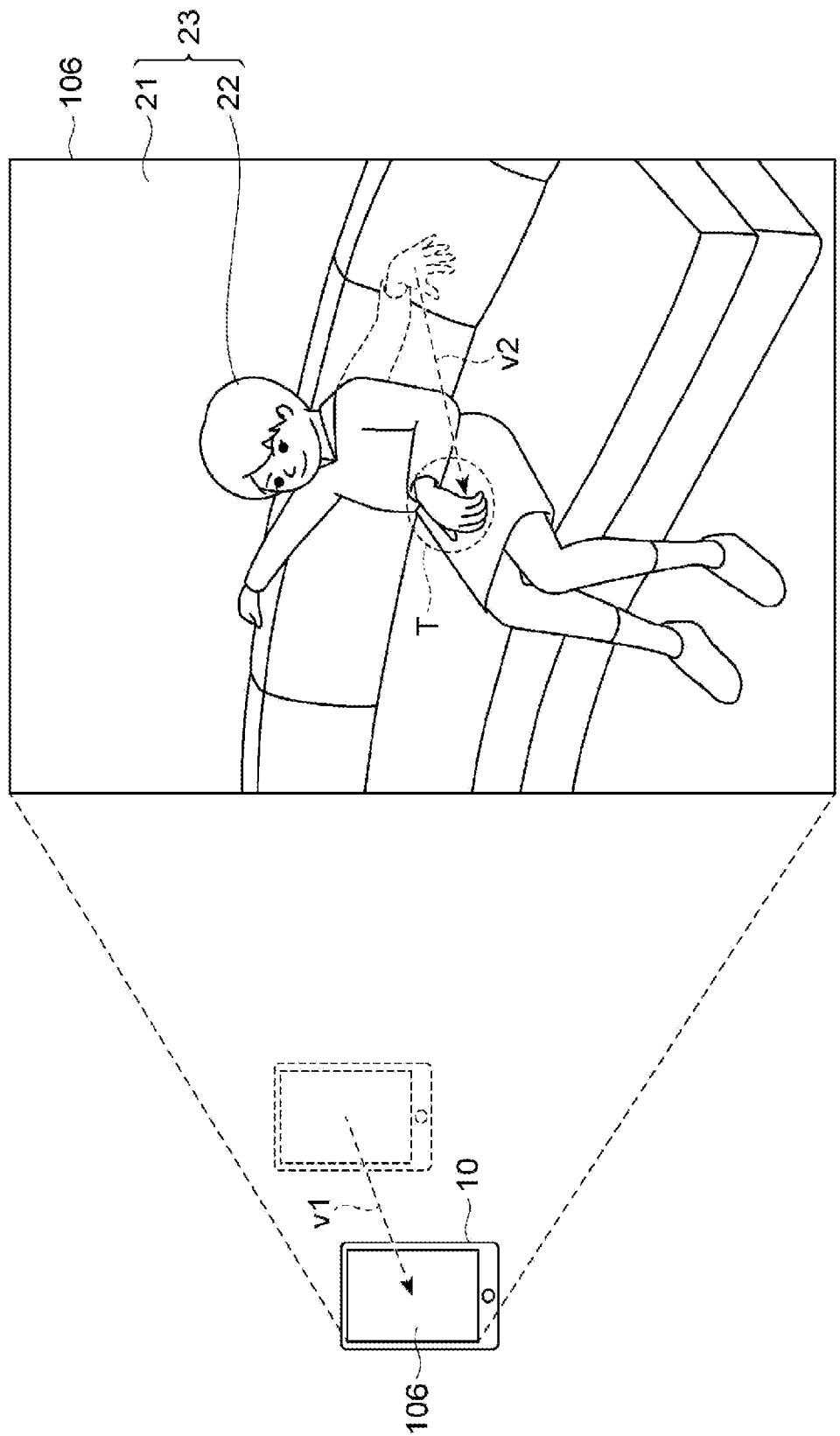
FIG. 5 illustrates the example moving operation of the character object.

An example operation of the user terminal 10 in a moving operation of a character object (i.e., a virtual object) in an augmented reality space will be described with reference to FIGS. 3 to 5. FIG. 3 is a flowchart illustrating an example processing procedure of the moving operation of the character object using the user terminal 10. FIGS. 4 and 5 illustrate an example moving operation of the character object. FIG. 4 illustrates a state before moving the character object. FIG. 5 illustrates a state after moving the character object.

In step S1, the display control unit 11 causes the touch screen 106 to display an augmented reality space image. More specifically, the display control unit 11 generates an augmented reality space image by superimposing the character object on the real space image, which has been acquired by the image-capturing unit 105, based on the virtual object information stored in the virtual object information storage unit 14. The display control unit 11 then causes the touch screen 106 to display the augmented reality space image. In this way, as illustrated in FIG. 4, an augmented reality space image 23 obtained by superimposing a character object 22 on a real space image 21 is displayed on the touch screen 106.

In step S2, the determination unit 12 determines at least a part of the character object 22 as an operation target. In the example in FIG. 4, a left hand (e.g., a joint corresponding to the left hand) of the character object 22 is determined as an operation target T by being tapped by a user.

In step S3, the object control unit 13 detects the direction and amount of a movement of the user terminal 10 after the operation target T has been determined. FIG. 5 illustrates an example where the user moves the user terminal 10 leftward and closer to the user, as viewed from the user. In FIG. 5, v1 is a displacement vector of the user terminal 10 (i.e., a vector indicating the direction and amount of the movement of the user terminal 10). The displacement vector v1 is, for example, detected by the sensor 107 and transmitted to the object control unit 13. In this way, the object control unit 13 can detect the displacement vector v1.

In step S4, the object control unit 13 moves the operation target T based on the detected displacement vector v1. That is, the object control unit 13 adjusts the position of the operation target T based on the displacement vector v1 in the augmented reality space (i.e., a space on the same scale as the real space). In FIG. 5, v2 is a displacement vector of the operation target T (i.e., the vector indicating the direction and amount of a movement of the operation target T). The object control unit 13 moves the operation target T so that the displacement vectors v1 and v2 are parallel to each other. That is, the object control unit 13 moves the operation target T in the same direction as the direction of the movement of the user terminal 10 in the real space. This configuration allows the user to move the operation target T intuitively. That is, the movement of the user terminal 10 in the real space allows a smooth movement of the operation target T not only in the two-dimensional, vertical and horizontal directions but in the three-dimensional directions including the depth.

In the example in FIG. 5, the user moves the user terminal 10 leftward and closer to the user, as viewed from the user so that the operation target T moves in the same direction as the direction (i.e., leftward and closer to the user as viewed from the user) of the movement of the user terminal 10. In this example, the bones connected to the operation target T (and other joints connected to the operation target T via the bones) also move in conjunction with the movement of the operation target T (i.e., the left hand of the character object 22). The directions and amounts of movements of the parts other than the operation target T can be calculated out based on, for example, a positional relationship(s) between adjacent joints and an operation rule determined in advance based on rationality, consistency, and any other suitable factors of a body motion. The positional relationship between of the joints and the operation rule are included in, for example, the virtual object information related to the character object 22.

In step S4 described above, the object control unit 13 may be configured to determine the amount of the movement of the operation target T based on the detected amount of the movement of the user terminal 10 (i.e., the magnitude |v1| of the displacement vector v1) and a parameter a set in advance. For example, the object control unit 13 may be configured to determine, as the amount |v2| of the movement of the operation target T, a value obtained by increasing the detected amount |v1| of the movement of the user terminal 10 based on the parameter a. For example, the parameter a may be a coefficient, by which the amount |v1| of the movement of the user terminal 10 is multiplied, and which is larger than one. In this case, the object control unit 13 determines the amount |v2| of the movement of the operation target T based on the following equation (1).

$$|v2|=|v1|\times a \quad (1)$$

For example, if the parameter a is five, the amount |v2| of the movement of the operation target T is 5 cm when the amount |v1| of the movement of the user terminal 10 is 1 cm. With such a configuration that the amount of a movement of the operation target T is amplified than the amount of an actual movement of the user terminal 10, the operability improves. As described above, the amplification operation of exaggerating the amount of a movement of the operation target T than the amount of an actual movement of the user terminal 10 is effective, for example, for a case where it is desired that the position of the operation target T be changed to relatively large extent. For example, in order to move the operation target T by 1 m, the moving operation of the operation target T can be made by the user simply moving the user terminal 10 at a shorter distance (e.g., 20 cm).

As an alternative, the object control unit 13 may be configured to determine, as the amount |v2| of the movement of the operation target T, a value obtained by decreasing the detected amount |v1| of the movement of the user terminal 10 based on the parameter a. For example, the object control unit 13 may be configured to diminish the amount of a movement of the operation target T than the amount of an actual movement of the user terminal 10, using the parameter a set to a value smaller than 1 together with the value 1 and the equation (1). Such processing improves the operability in fine position adjustment of the operation target T. That is, by intentionally reducing the sensitivity (i.e., the amount of the movement) of the operation target T according to the movement of the user terminal 10, accurate position adjustment of the operation target T becomes possible.

Note that the parameter a is not limited to the coefficient used for multiplying the amount |v1| of the actual movement of the user terminal 10 as in the equation (1) illustrated above. The parameter a may be a fixed value determined in advance by the virtual object operation program P1 or may be a value variable by user settings or the like. If the variable parameter a is adjustable, the user may adjust the parameter a in accordance with the situation of use. For example, as described above, the parameter a can be set larger in order to move the operation target T relatively largely, or smaller in order to adjust adjustment of the position of the operation target T finely.

Here, it is also conceivable that, in step S4, the operation target T is rotated in accordance with the rotation of the user terminal 10 by configuring such that the motion of the operation target T is fully in conjunction with the motion of the user terminal 10. However, there would be such a drawback that, in case of employing the mechanism of rotating the operation target T by causing the motion of the operation target T to be fully in conjunction with the motion of the user terminal 10, the posture of the operation target T would reflect a minute change (rotation) in the orientation of the user terminal 10, even though such a change is not intended by the user. In addition, in order to rotate the operation target T from the front to the back as viewed from the user by 180 degrees, this configuration requires the user to similarly rotate the user terminal 10 by 180 degrees. In this case, the orientation of the user terminal 10 changes from the state with the touch screen 106 facing toward the user to the state with the touch screen 106 facing away from the user in the opposite direction. As a result, the user cannot check the touch screen 106 after the rotation operation (i.e., the user cannot promptly check the state of the operation target T in the augmented reality space via the touch screen 106).

To address the drawback, this embodiment is configured such that the object control unit 13 moves the operation target T based on the displacement vector v1 without rotating the operation target T based on the change in the attitude of the user terminal 10. That is, the object control unit 13 achieves the rotation operation of the operation target T using a framework different from the moving operation of the operation target T (i.e., the operation based on the direction and distance of the movement of the user terminal 10). This can prevent the drawback described above.

[Rotation Operation of Character Object]

Figure 6:
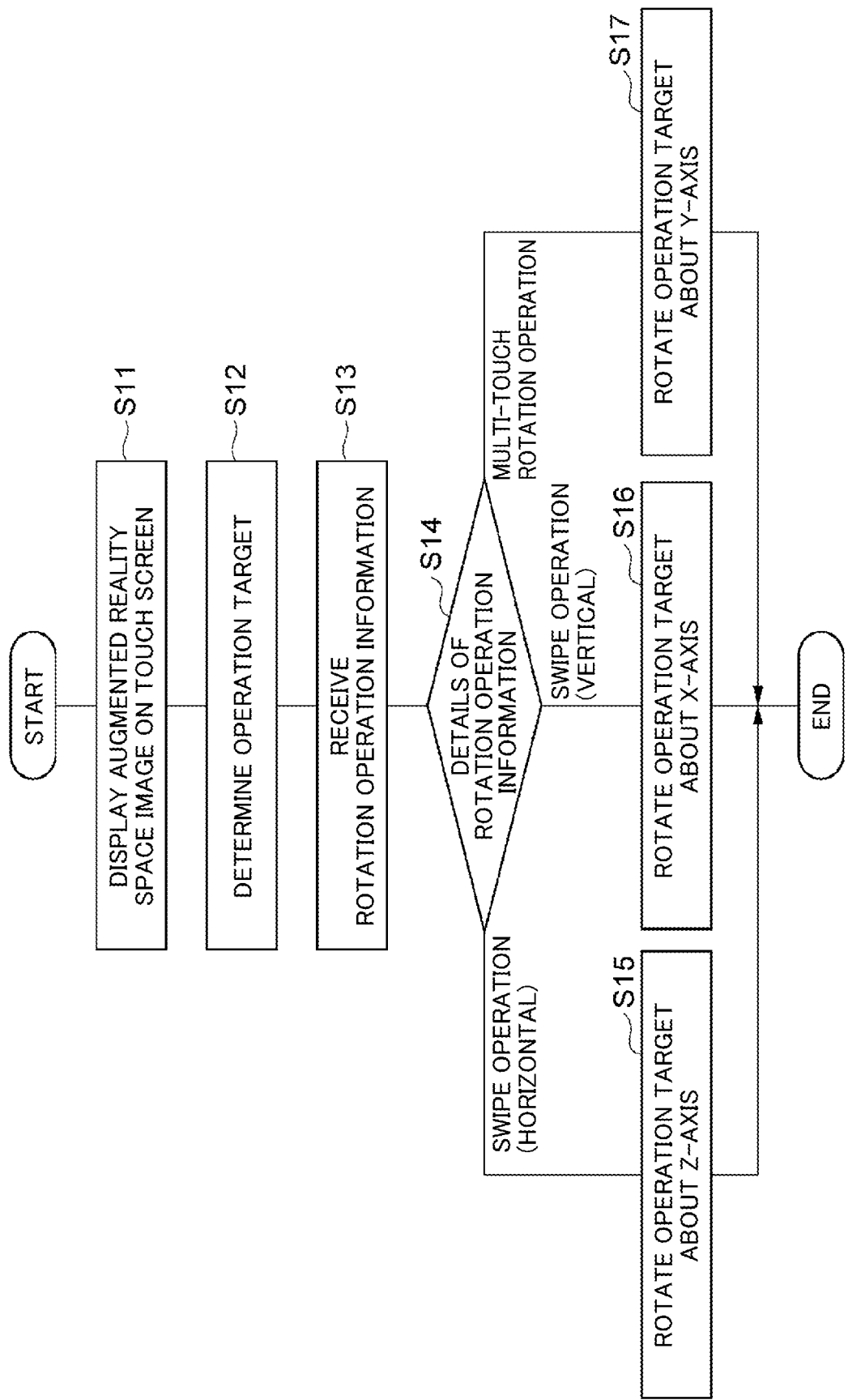
FIG. 6 is a flowchart illustrating an example processing procedure of a rotation operation of a character object using the user terminal in FIG. 1.
Figure 7:
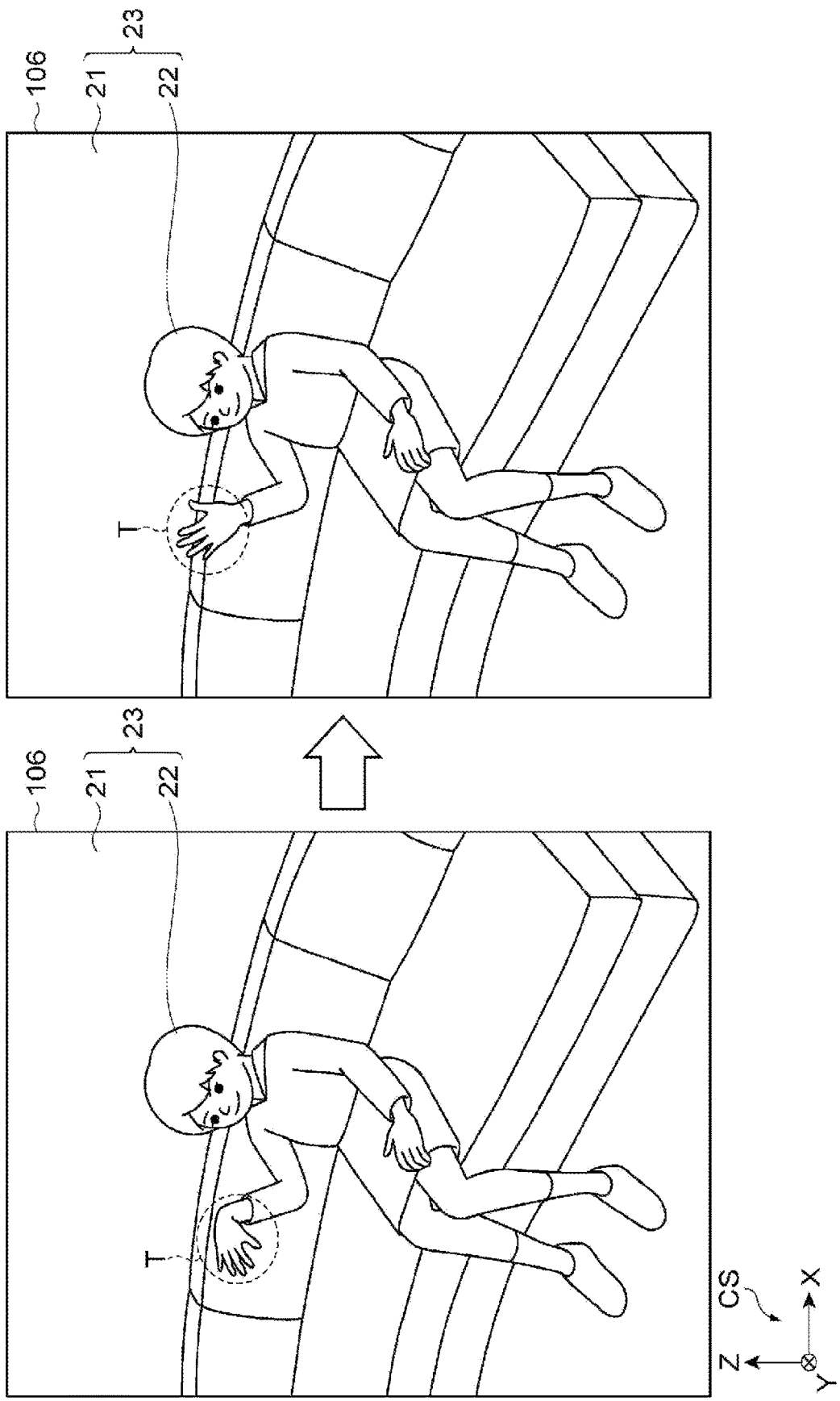
FIG. 7 illustrates an example rotation operation of the character object.
Figure 8:
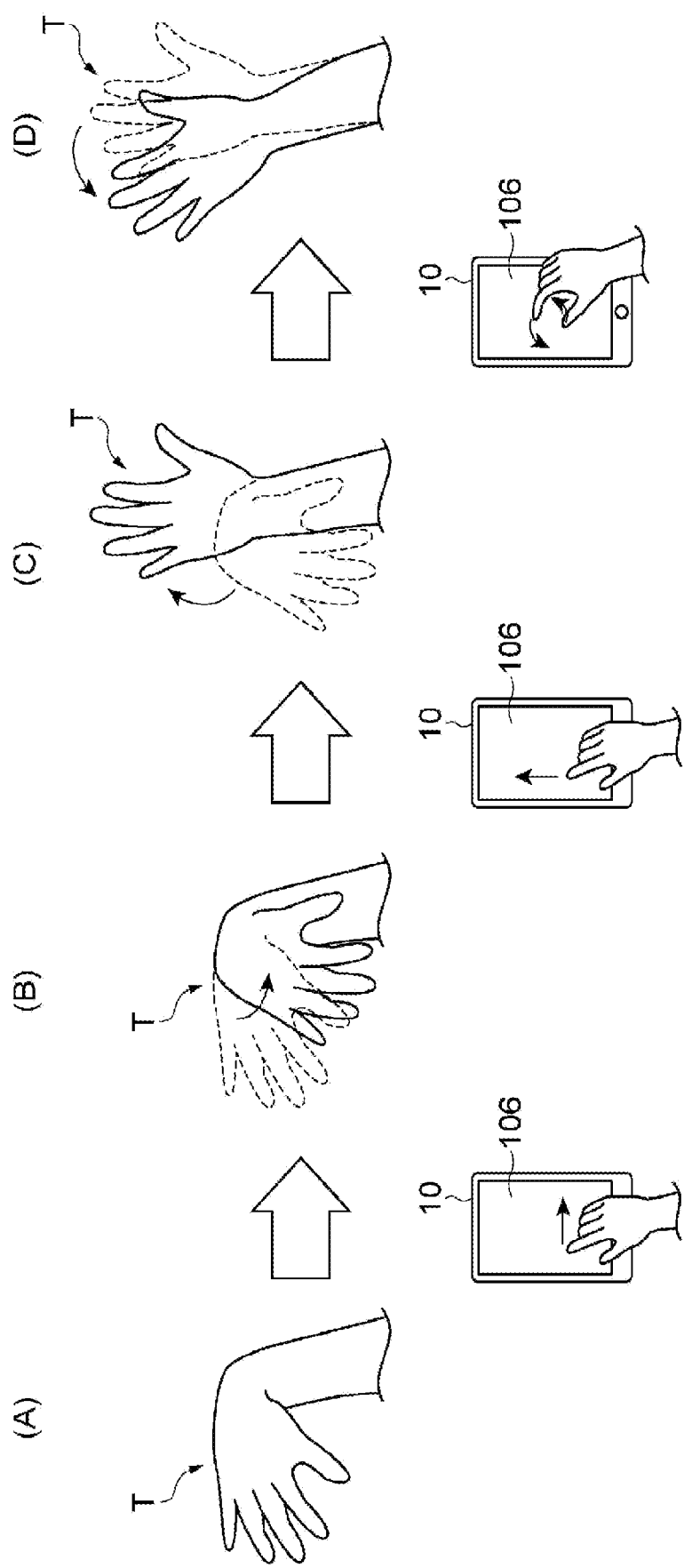
FIG. 8 illustrates the example rotation operation of the character object.

An example operation of the user terminal 10 performed for a rotation operation of a character object (i.e., a virtual object) in an augmented reality space will be described with reference to FIGS. 6 to 9. FIG. 6 is a flowchart illustrating an example processing procedure of the rotation operation of the character object using the user terminal 10. FIGS. 7 and 8 illustrate an example rotation operation of the character object. FIG. 9 illustrates a rotation operation of a virtual object according to a comparative example.

Steps S11 and S12 are the same as the processing (steps S1 and S2 in FIG. 3) in the moving operation of the character object 22. That is, in step S11, the display control unit 11 causes the touch screen 106 to display the augmented reality space image 23. Thereafter, in step S12, the determination unit 12 determines at least a part of the character object 22 as the operation target T. In the example in FIG. 7, a right hand (e.g., a joint corresponding to the right hand) of the character object 22 is determined as an operation target T by being tapped by a user.

In step S13, the object control unit 13 receives rotation operation information. The rotation operation information is for instructing a rotation operation of the operation target T. The rotation operation information includes information indicating the direction of rotation of the operation target T. The direction of rotation of the operation target T is specified based on an orthogonal coordinate system CS (see FIG. 7), which is set with reference to the direction of capturing an image by the image-capturing unit 105. In other words, the orthogonal coordinate system CS is set with reference to the point of view from the image-capturing unit 105 (i.e., the angle of the augmented reality space image 23 displayed on the touch screen 106). That is, the orthogonal coordinate system CS changes in accordance with a change in the point of view from the image-capturing unit 105.

In the example in FIG. 7, the orthogonal coordinate system CS includes three axes (X-, Y-, and Z-axes) orthogonal to each other. The X-(pitch) axis extends in the left-right direction with reference to the direction of image-capturing by the image-capturing unit 105 (i.e., the left-right direction of the augmented reality space image 23 displayed on the touch screen 106). The Y-(roll) axis extends in the front-back direction with reference to the direction of image-capturing by the image-capturing unit 105 (i.e., the depth direction of the augmented reality space image 23 displayed on the touch screen 106). The Z-(yaw) axis extends in the up-down direction with reference to the direction of image-capturing by the image-capturing unit 105 (i.e., the up-down direction of the augmented reality space image 23 displayed on the touch screen 106).

Upon receipt of the rotation operation information, the object control unit 13 rotates the operation target T based on the rotation operation information (steps S14 to S17). In FIG. 7, a state (A) illustrates a state before rotating the operation target T, while a state (B) illustrates a state after rotating the operation target T. FIG. 8 illustrates an example rotation operation for changing the posture of the operation target T from the state (A) in FIG. 7 to the state (B) in FIG. 7. In this example, in order to change the posture of the operation target T from the state (A) in FIG. 7 to the state (B) in FIG. 7, the following rotation operations are executed: a rotation operation (hereinafter referred to as a "first rotation operation"), which is for changing the posture of the operation target T from a state (A) in FIG. 8 to a state (B) in FIG. 8; another rotation operation (hereinafter referred to as "second rotation operation"), which is for changing the posture of the operation target T from the state (B) in FIG. 8 to a state (C) in FIG. 8; and yet another rotation operation (hereinafter referred to as "third rotation operation"), which is for changing the posture of the operation target T from the state (C) in FIG. 8 to a state (D) in FIG. 8.

The first rotation operation (i.e., from the state (A) to the state (B) in FIG. 8) can be executed by, for example, a horizontal swipe operation on the touch screen 106. For example, if the object control unit 13 detects a swipe operation of a user's finger on the touch screen 106 sliding in the left-right direction (i.e., in the horizontal direction) (swipe operation (horizontal) in step S14), the object control unit 13 rotates the operation target T about the Z-axis (step S15). That is, the object control unit 13 receives the horizontal swipe operation on the touch screen 106 as rotation operation information indicating that rotation of the operation target T about the Z-axis is instructed. As an example, the object control unit 13 receives a rightward swipe operation as rotation operation information indicating that clockwise rotation of the operation target T with respect to the positive direction of the Z-axis (i.e., upward) is instructed, and a leftward swipe operation as rotation operation information indicating that counterclockwise operation of the operation target T with respect to the positive direction of the Z-axis is instructed.

In the example in FIG. 8, the object control unit 13 receives a swipe operation to the right when the posture of the operation target T is in the state (A), and changes the posture of the operation target T to the state (B) based on the swipe operation. This changes the orientation of the fingertips of the right hand (i.e., the operation target T) of the character object 22 bent inward substantially at a right angle from the state (i.e., the state (A)) of pointing the left as viewed from the image-capturing unit 105 to the state (i.e., the state (B)) of pointing the front as viewed from the image-capturing unit 105.

The second rotation operation (i.e., from the state (B) to the state (C) in FIG. 8) can be executed by, for example, a vertical swipe operation on the touch screen 106. For example, upon detection of a swipe operation of a user's finger on the touch screen 106 sliding in the up-down direction (i.e., in the vertical direction) (swipe operation (vertical) in step S14), the object control unit 13 rotates the operation target T about the X-axis (step S16). More specifically, the object control unit 13 receives the vertical swipe operation on the touch screen 106 as rotation operation information indicating that rotation of the operation target T about the X-axis is instructed. As an example, the object control unit 13 receives an upward swipe operation as rotation operation information indicating that counterclockwise operation of the operation target T with respect to the positive direction of the X-axis (i.e., to the right) is instructed, and a downward swipe operation as rotation operation information indicating that clockwise rotation of the operation target T with respect to the positive direction of the X-axis is instructed.

In the example in FIG. 8, when the posture of the operation target T is in the state (B), the object control unit 13 receives an upward swipe operation and changes the posture of the operation target T to the state (C) based on the swipe operation. Accordingly, the right hand (i.e., the operation target T) of the character object 22 bent inward substantially at a right-angle changes to stretch straight (i.e., the state (C)).

The third rotation operation (i.e., from the state (C) to the state (D) in FIG. 8) can be executed by, for example, a multi-touch rotation operation on the touch screen 106. The multi-touch rotation operation is an operation of pressing two different points on the touch screen 106 with two fingers (e.g., a thumb and an index finger) and sliding the two fingers in the same direction of rotation. For example, if the object control unit 13 detects the multi-touch rotation operation on the touch screen 106 (multi-touch rotation operation in step S14), the object control unit 13 rotates the operation target T about the Y-axis (step S17). More specifically, the object control unit 13 receives the multi-touch rotation operation on the touch screen 106 as rotation operation information indicating that rotation of the operation target T about the Y-axis is instructed. For an example, the object control unit 13 rotates the operation target T in the same rotation direction as the direction of rotation in the multi-touch rotation operation. More specifically, the object control unit 13 receives a counterclockwise multi-touch rotation operation on the touch screen 106 as rotation operation information indicating that counterclockwise operation of the operation target T with respect to the positive direction of the Y-axis (i.e., toward the back of the screen) is instructed, and a clockwise multi-touch rotation operation on the touch screen 106 as rotation operation information indicating that clockwise rotation of the operation target T with respect to the positive direction of the Y-axis is instructed.

In the example in FIG. 8, when the posture of the operation target T is in the state (C), the object control unit 13 receives a counterclockwise multi-touch rotation operation on the touch screen 106 and changes the posture of the operation target T to the state (D) based on the multi-touch rotation operation. Accordingly, the right hand (i.e., the operation target T) of the character object 22 stretching straight in the vertical direction changes to slightly incline to the left (i.e., the state (D)).

The amount of rotation (i.e., the angle) of the operation target T in steps S15 to S17 can be determined by, for example, the amount of sliding (the distance of sliding) on the touch screen 106, the slide speed, and any other suitable factor. In addition, the first and second rotation operations described above may be performed simultaneously. For example, the user may perform a swipe operation of sliding a finger on the touch screen 106 obliquely (e.g., toward the upper left, the lower left, the upper right, or the lower right). Such a swipe operation can be decomposed into a horizontal swipe operation component and a vertical swipe operation component by vector decomposition. In this case, the object control unit 13 may be configured to rotate the operation target T about the Z-axis based on the horizontal swipe operation component and about the X-axis based on the vertical swipe operation component.

[Advantages]

As described above, a user terminal 10 according to one aspect of the present disclosure is for presenting an augmented reality space to a user. The terminal device includes: an image-capturing unit 105 configured to capture an image of a real space; a touch screen (display unit) 106 configured to display an augmented reality space image 23 representing the augmented reality space including the real space captured by the image-capturing unit 105 and a virtual object; a determination unit 12 configured to determine at least a part of the virtual object as an operation target T; and an object control unit 13 configured to control an operation of the operation target T in the augmented reality space. The object control unit 13 detects a direction of a movement and an amount of a movement (a displacement vector v1 in the embodiment described above) of the user terminal 10 after the operation target T has been determined, and moves the operation target T based on the direction and the amount of the movement detected of the user terminal 10.

A virtual object operation method according to an aspect of the present disclosure includes: displaying, on a touch screen 106, an augmented reality space image 23 representing an augmented reality space including a real space captured by an image-capturing unit 105 and a virtual object; determining at least a part of the virtual object as an operation target T; detecting a direction of an amount of a movement of the user terminal 10 after the operation target T has been determined; and moving the operation target T in the augmented reality space based on the direction of movement detected and the amount of movement detected of the user terminal 10.

A virtual object operation program P1 according to an aspect of the present disclosure is for causing a user terminal 10 to execute: displaying, on a touch screen 106, an augmented reality space image 23 representing an augmented reality space including a real space captured by an image-capturing unit 105 and a virtual object; determining at least a part of the virtual object as an operation target T; detecting a direction and an amount of a movement of the user terminal 10 after the operation target T has been determined; and moving the operation target T in the augmented reality space based on the direction of movement detected and the amount of movement detected of the user terminal 10.

In such aspects, the operation target T (at least a part of the virtual object) is movable in the augmented reality space in accordance with the direction and amount of the movement of the user terminal 10 in the real space. That is, the aspects described above provide the user with a mechanism capable of allowing intuitive position adjustment of the operation target T in the augmented reality space which is a three-dimensional space. More specifically, these aspects make it possible for the user to intuitively adjust the position of the operation target T in the augmented reality space by moving the user terminal 10 in a direction in which the user wants to move the operation target T.

A virtual object (e.g., the character object 22 in the embodiment described above) displayed in the augmented reality space may include a plurality of parts, and the determination unit 12 may determine one of the parts as the operation target T. In this case, fine position adjustment is possible for each of the parts of the virtual object.

The object control unit 13 may be configured to receive rotation operation information including the direction of rotation of the operation target T specified based on the orthogonal coordinate system CS (see FIG. 7) including three axes (X-, Y-, and Z-axes), which is set with reference to the direction of image-capturing by the image-capturing unit 105 and used as the rotation axes of the operation target T. The object control unit 13 may then rotate the operation target T based on the rotation operation information. In this case, since the orthogonal coordinate system CS defining the three rotation axes of the operation target T is determined with reference to the direction of image-capturing by the image-capturing unit 105, an intuitive rotation operation of the operation target T is possible. That is, as illustrated in FIG. 8, the user rotates the operation target T in an intuitively determinable direction with reference to the direction in which the user views the augmented reality space via the touch screen 106.

This will be described in detail with reference to the comparative example illustrated in FIG. 9. In the comparative example, an orthogonal coordinate system CS1 defining three rotation axes (i.e., X-, Y-, and Z-axes) of a virtual object 30 is determined based not on the direction of image-capturing by the image-capturing unit 105 (i.e., the direction in which the user views the augmented reality space via the touch screen 106) but on the posture of the virtual object 30. Here, as an example, the orthogonal coordinate system CS1 includes the X-axis perpendicular to a first surface 31 of a cubic virtual object 30, the Y-axis perpendicular to a second surface 32, and the Z-axis perpendicular to a third surface 33. Here, the first surface 31, the second surface 32, and the third surface 33 are adjacent to each other.

FIG. 9 illustrates a state (B) after rotating the virtual object 30 in a state (A) in FIG. 9 about the X-axis. At this time, the rotation of the virtual object 30 around the X-axis changes the orientations of the axes (Y-axis and Z-axis) other than the X-axis constituting the orthogonal coordinate system CS1. FIG. 9 illustrates a state (C) after further rotating the virtual object 30 in the state (B) in FIG. 9 about the Y-axis. At this time, the orientations of the axes (X-axis and Z-axis) other than the Y-axis constituting the orthogonal coordinate system CS1 change. In this manner, in the orthogonal coordinate system CS1 determined with reference to the posture of the virtual object 30, the orientations of the orthogonal coordinate system CS1 change in accordance with a change in the posture of the virtual object 30 even if the direction of image-capturing by the image-capturing unit 105 does not change. Even in a same kind of rotation operation (e.g., an operation of rotating the virtual object 30 about the Z-axis), the direction of rotation of the virtual object 30 as viewed from the user changes depending on the posture of the virtual object 30 at that time. For example, the direction of rotation viewed from the user at the time of rotating the virtual object 30 about the Z-axis in the state (A) in FIG. 9 does not coincide with the direction of rotation viewed from the user at the time of rotating the virtual object 30 about the Z-axis in the state (B) or (C) in FIG. 9. On the other hand, the orthogonal coordinate system CS (see FIG. 8) used for the rotation operation of the operation target T in the embodiment described above is determined with reference to the direction of image-capturing by the image-capturing unit 105 (i.e., the direction in which the user views the augmented reality space via the touch screen 106) and does not change depending on the shape of the operation target T. Therefore, the embodiment described above allows the user to always rotate the operation target T with the same operation feeling regardless of the shape of the operation target T.

[Modifications]

The present disclosure has been described above in detail based on the embodiments. However, the present disclosure is not limited to the embodiments described above. The present disclosure may be modified in various ways without departing from the spirit and scope thereof.

For example, some of the functions of the user terminal 10 described above may be executed by another computer device that is communicative with the user terminal 10. That is, the user terminal 10 may cause another computer device to execute some of the functions described above and receive the processing results from the other computer device, thereby implementing the functions described above.

The possible operations on the operation target T determined by the determination unit 12 are not limited to the moving operation and the rotation operation described above. For example, the possible operations on the operation target T may include an operation of selecting the orientation of the operation target T from a plurality of shapes registered in advance. For example, if a hand of the character object 22 is the operation target T, the possible operations on the operation target T may include an operation of selecting a pose of the hand from a plurality of poses, such as "open," "closed", and a "V-sign", registered in advance.

While the embodiments described above are such that a part (section) of the character object 22 is determined as the operation target T, the operation target T may be the entire character object 22. For example, for determining the location of the character object 22 in the augmented reality space, or for like purposes, the entire character object 22 may be determined as the operation target T. Further, a virtual object (e.g., an inanimate object or an object imitating an object imitating a cursor or any other suitable pointer described above) other than the character object 22 may be determined as the operation target T.

Two or more virtual objects may be arranged in the augmented reality space. For example, assume that a virtual object (hereinafter simply referred to as an "apple") imitating an apple and the character object 22 are arranged in the augmented reality space. In such a case, the apple may be determined as the operation target T and a moving operation of putting the apple on the head of the character object 22 may be executed, for example. The moving operation by the object control unit 13 described above allows the user to smoothly adjust the position of the apple by moving the user terminal 10 and thus performs the moving operation described above intuitively and easily.

The part of the virtual object (e.g., character object 22) determined as the operation target T is not limited to a hand illustratively described in the embodiments described above. For example, a part, such as a foot, an elbow, a knee, or a waist (e.g., a part corresponding to a joint) other than a hand may be determined as the operation target T. For example, a part, such as eyes, a mouth, and a nose, other than a joint may be determined as the operation target T.

Moreover, the augmented reality space image 23 may be such that a guide be displayed to indicate a selectable part of the virtual object, which is selectable as the operation target T (e.g., the guide may be a circle surrounding the selectable part). Note that the guide may include information indicating postures of the operation target T (e.g., postures orienting in the frontward, sideward, upward, downward directions set in advance for the operation target T). In order to clarify the part selected as the operation target T, a guide for indicating the part selected as the operation target T may be displayed in a different display mode (e.g., a different color) from the guides for the parts not selected as the operation target T.

The processing procedure of the method (i.e., the virtual object operation method) executed by the user terminal 10 is not limited to the examples in the embodiments described above (e.g., the flowcharts in FIGS. 3 and 6). For example, one or some of the above-described steps (processing) may be omitted, or the steps may be executed in another order different from the one in the example. Any two or more of the above-described steps may be combined, or part of the steps may be modified or deleted. As an alternative, other steps may be performed in addition to the steps described above.

DESCRIPTION OF REFERENCE CHARACTERS

10 User Terminal (Terminal Device), 11 Display Control Unit, 12 Determination Unit, 13 Object Control Unit, 14 Virtual Object Information Storage Unit, 21 Real Space Image, 22 Character Object (Virtual Object), 23 Augmented Reality Space Image, 101 Processor, 105 Image-Capturing Unit, 106 Touch Screen (Display Unit), 107 Sensor, CS Orthogonal Coordinate System, T Operation Target

The invention claimed is:

1. A terminal device configured to present an augmented reality space to a user, comprising a processor configured to:
    capture an image of a real space;
    cause a display unit to display an augmented reality space image representing the augmented reality space, the augmented reality space including the real space and a virtual object;
    determine at least a part of the virtual object as an operation target; and
    control an operation of the operation target in the augmented reality space;
    detect a direction and an amount of a movement of the terminal device after the operation target is determined; and
    move the operation target based on the detected direction and amount of the movement of the terminal device.

2. The terminal device of claim 1, wherein the processor is configured to determine an amount of a movement of the operation target based on the detected amount of the movement of the terminal device and a parameter set in advance.

3. The terminal device of claim 2, wherein the processor is configured to determine, as the amount of the movement of the operation target, a value obtained by increasing the detected amount of the movement of the terminal device based on the parameter.

4. The terminal device of claim 2, wherein the processor is configured to determine, as the amount of the movement of the operation target, a value obtained by decreasing the detected amount of the movement of the terminal device based on the parameter.

5. The terminal device of claim 1, wherein the processor is configured to move the operation target based on the detected direction and amount of the movement of the terminal device without rotating the operation target in accordance with a change in an attitude of the terminal device.

6. The terminal device of claim 1, wherein
    the virtual object includes a plurality of parts, and
    the processor is configured to determine, as the operation target, one of the plurality of parts of the virtual object.

7. The terminal device of claim 1, wherein the processor is configured to:
    receive rotation operation information including a direction of rotation of the operation target, the direction of rotation specified based on an orthogonal coordinate system including three axes, the three axes set with reference to a direction of image-capturing and used as rotation axes of the operation target; and rotate the operation target based on the rotation operation information.

8. A virtual object operation method, comprising:
displaying, on a display unit included in a terminal device, an augmented reality space image representing an augmented reality space, the augmented reality space including a real space captured by the terminal device and a virtual object;
determining at least a part of the virtual object as an operation target;
detecting a direction and an amount of a movement of the terminal device after the operation target is determined; and
moving the operation target in the augmented reality space based on the detected direction and amount of the movement of the terminal device.

9. The method of claim 8, further comprising determining an amount of a movement of the operation target based on the detected amount of the movement of the terminal device and a parameter set in advance.

10. The method of claim 9, wherein determining the amount of the movement of the operation target includes determining a value obtained by increasing the detected amount of the movement of the terminal device based on the parameter.

11. The method of claim 9, wherein determining the amount of the movement of the operation target includes determining a value obtained by decreasing the detected amount of the movement of the terminal device based on the parameter.

12. The method of claim 8, wherein moving the operation target includes moving the operation target based on the detected direction and amount of the movement of the terminal device without rotating the operation target in accordance with a change in an attitude of the terminal device.

13. The method of claim 8, wherein
the virtual object includes a plurality of parts, and
the method further comprises determining, as the operation target, one of the plurality of parts of the virtual object.

14. The method of claim 8, further comprises:
receiving rotation operation information including a direction of rotation of the operation target, the direction of rotation specified based on an orthogonal coordinate system including three axes, the three axes set with reference to a direction of image-capturing and used as rotation axes of the operation target; and
rotating the operation target based on the rotation operation information.

15. A non-transitory computer-readable medium storing a virtual object operation program that, when executed, causes a terminal device to execute:
displaying, on a display unit included in a terminal device, an augmented reality space image representing an augmented reality space, the augmented reality space including a real space captured by the terminal device and a virtual object;
determining at least a part of the virtual object as an operation target;
detecting a direction and an amount of a movement of the terminal device after the operation target is determined; and
moving the operation target in the augmented reality space based on the detected direction and amount of the movement of the terminal device.

16. The non-transitory computer-readable medium of claim 15, wherein the program causes the terminal device to further execute determining an amount of a movement of the operation target based on the detected amount of the movement of the terminal device and a parameter set in advance.

17. The non-transitory computer-readable medium of claim 16, wherein determining the amount of the movement of the operation target includes determining a value obtained by increasing or decreasing the detected amount of the movement of the terminal device based on the parameter.

18. The non-transitory computer-readable medium of claim 16, wherein moving the operation target includes moving the operation target based on the detected direction and amount of the movement of the terminal device without rotating the operation target in accordance with a change in an attitude of the terminal device.

19. The non-transitory computer-readable medium of claim 15, wherein
the virtual object includes a plurality of parts, and
the program causes the terminal device to further execute determining, as the operation target, one of the plurality of parts of the virtual object.

20. The non-transitory computer-readable medium of claim 15, wherein the program causes the terminal device to further execute:
receiving rotation operation information including a direction of rotation of the operation target, the direction of rotation specified based on an orthogonal coordinate system including three axes, the three axes set with reference to a direction of image-capturing and used as rotation axes of the operation target; and
rotating the operation target based on the rotation operation information.

* * * * *